United States Patent
Dorum

(10) Patent No.: US 10,546,400 B2
(45) Date of Patent: Jan. 28, 2020

(54) METHOD AND APPARATUS FOR DEFINING BI-DIRECTIONAL ROAD GEOMETRY FROM PROBE DATA

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/729,733

(22) Filed: Jun. 3, 2015

(65) Prior Publication Data

US 2016/0358349 A1    Dec. 8, 2016

(51) Int. Cl.
*G06T 11/20* (2006.01)
*G01C 21/26* (2006.01)

(52) U.S. Cl.
CPC ............ *G06T 11/206* (2013.01); *G01C 21/26* (2013.01); *G06T 11/203* (2013.01)

(58) Field of Classification Search
CPC ..... G06T 11/203; G06T 11/206; G01C 21/26; G01C 21/00
USPC .......................................................... 345/440
See application file for complete search history.

(56) References Cited

U.S. PATENT DOCUMENTS

| 6,385,539 B1* | 5/2002 | Wilson | G01C 21/30 |
| | | | 340/905 |
| 6,996,507 B1 | 2/2006 | Myr | |
| 8,566,021 B2 | 10/2013 | Smartt | |
| 2009/0138497 A1 | 5/2009 | Zavoli et al. | |
| 2010/0082307 A1* | 4/2010 | Dorum | G01C 21/30 |
| | | | 703/2 |
| 2012/0004845 A1 | 1/2012 | Kmiecik et al. | |
| 2012/0116678 A1* | 5/2012 | Witmer | G01C 21/32 |
| | | | 702/5 |
| 2013/0328863 A1 | 12/2013 | Pirwani | |

(Continued)

FOREIGN PATENT DOCUMENTS

| EP | 1 857 780 A2 | 11/2007 |
| WO | WO 2009/059766 A1 | 5/2009 |

OTHER PUBLICATIONS

Agamennoni, G. et al.. Robust Inference of Principal Road Paths for Intelligent Transportation Systems, IEEE Transactions on Intelligent Transportation Systems, vol. 12, No. 1 (Mar. 2011) 298-308.*

(Continued)

*Primary Examiner* — Michael Le
(74) *Attorney, Agent, or Firm* — Alston & Bird LLP

(57) ABSTRACT

A method, apparatus and computer program product are provided to define bi-directional road geometry based upon a plurality of probe points. An orientation representative of one or more probe points is determined and a seed point representative of one or more probe points is then determined. The seed point is based on a determination of a constrained weighted center of mass of the one or more probe points. The movement of the constrained weighted center of mass is limited to a direction based upon respective headings of the one or more probe points. Polylines are created to be representative of a bi-directional road geometry. The polylines are created to be representative of one direction of travel along the bi-directional road geometry by extending a first polyline in the orientation from the seed point and by extending a second polyline in an opposite orientation from the seed point.

20 Claims, 8 Drawing Sheets

(56) References Cited

U.S. PATENT DOCUMENTS

2014/0095062 A1* 4/2014 Wang .................. G01C 21/32
701/409
2014/0249716 A1 9/2014 Dorum et al.

OTHER PUBLICATIONS

Schroedl, S. et al.. Mining GPS Traces for Map Refinement, Data Mining and Knowledge Discovery, Kluwer Academic Publishers, vol. 9, No. 1, (2004) 59-87.*

Agamennoni, G. et al.. Robust Inference of Principal Road Paths for Intelligent Transportation Systems, IEEE Transactions on Intelligent Transportation Systems, vol. 12, No. 1 (Mar. 2011) 298-308 (Year: 2011).*

Extended European Search Report for corresponding European Application No. 16172985.0 dated Oct. 27, 2016, 11 pages.

Extended European Search Report for corresponding European Application No. 16172986.8 dated Nov. 10, 2016, 10 pages.

I-95 Vehicle Probe Project & National Performance Measures Research Data Set Description [online] [retrieved from the Internet Jan. 30, 2015]. Retrieved from the Internet: <URL: http://i95coalition.org/i95/Portals/0/Public_Files/uploaded/Vehicle-Probe/I95_Fact_Sheet_V11.pdf>. 3 pages.

3D City Modeling from Street-Level Data for Augmented Reality Applications [online] [retrieved Feb. 25, 2016]. Retrieved from the Internet: <URL: http://physbam.standford.edu/~aanjneya/mridul_files/papers/modeling.pdf>. 8 pages.

Hasberg, Carsten et al.; "Integrating Spline Curves in Road Constraint Object Tracking"; Proceedings of the 11th International IEEE Conference on Intelligent Transportation Systems; Beijing, China, Oct. 12-15, 2008; 6 pages.

In re: Ole Henry Dorum; U.S. Application titled Method and Apparatus for Generating Map Geometry Based on a Received Image and Probe Data; U.S. Appl. No. 14/622,026, filed Feb. 13, 2015.

Inferring Road Maps from Global Positioning System Traces—Survey and Comparative Evaluation [online] [retrieved Feb. 25, 2016]. Retrieved from the Internet: <URL: https://www.cs.uic.edu/~jakob/papers/biagioni-trr12.pdf>. 11 pages.

Integration of GPS Traces with Road Map [online] [retrieved Feb. 25, 2016]. from the Internet: <URL: Retrieved http://www.ikg.uni-hannover.de/fileadmin/ikg/staff/publications/Konferenzbeitraege_abstract_review/zhang_thiemann_sester_2010.pdf. 6 pags.

Jin, Hang et al.; "Road Feature Extraction from High Resolution Aerial Images Upon Rural Regions Based on Multi-Resolution Image Analysis and Gabor Filters"; Remote Sensing—Advanced Techniques Platforms, Chapter 17; Jun. 13, 2012; pp. 387-414.

Jo, Kichun et al.; "Generation of a Precise Roadway Map for Autonomous Cars"; IEEE Transactions on Intelligent Transportation Systems; vol. 15, No. 3; Jun. 2014; pp. 925-937.

Office Action for U.S. Appl. No. 14/729,681 dated Sep. 12, 2017, 18 pages.

Office Action for U.S. Appl. No. 14/729,733 dated Feb. 28, 2018, 19 pages.

Office Action for U.S. Appl. No. 14/729,681 dated Nov. 30, 2018.

Notice of Allowance for U.S. Appl. No. 14/729,681 dated Jun. 6, 2019.

Office Action for European Application No. 16 172 986.8 dated May 14, 2019, 7 pages.

* cited by examiner

METHOD AND APPARATUS FOR DEFINING BI-DIRECTIONAL ROAD GEOMETRY FROM PROBE DATA

TECHNOLOGICAL FIELD

An example embodiment is directed generally to the development of polylines representative of road geometry and, more particularly, to the development of polylines representative of bi-directional road geometry based upon probe data.

BACKGROUND

In order to define road geometry that may be utilized for mapping and navigational purposes, probe data may be collected from a variety of probe sources. For example, probe data that identifies the location and heading of a probe source at a particular moment in time may be provided by mobile telephones, such as smart phones, global positioning systems (GPS) that are carried by vehicles and other types of navigation systems. Several different techniques may be employed in order to create road geometry from probe data in instances in which the probe data has a relatively high density and includes relatively high frequency trajectory information.

For example, K-means trajectory clustering associates the trajectories of a cluster of seed points that are spatially close to one another and that have similar headings. However, K-means trajectory clustering generally requires probe data that has low noise and a high probe frequency which results in relatively short distances between probe points in order for the trajectory shape to approximate the road geometry. Another technique is trajectory merging in which probe trajectories are traversed and matching graph edges are merged. Trajectories that do not match existing edges create new edges in the graph. Trajectory merging also requires probe data having relatively low noise and high probe frequency such that there are relatively short distances between probe points in order for the trajectory shape to approximate the road geometry.

A kernel density estimation technique may also be utilized to create road geometry by computing an approximate kernel density estimate of trajectories of probe points or edges over an area of interest. The kernel density estimation technique applies a threshold to produce a binary image of the roads followed by the use of various methods, such as thinning, to produce road centerlines from the binary image. The kernel density estimation technique also requires high density probe data.

Another technique utilizes principal curves. Principal curves describe self-consistent curves that pass through the middle of point data. The principal curves technique may detect individual road segments that require additional logic to address intersections and to create a road network graph. The principal curves technique also requires high probe point density and uniform probe point density to produce the desired results.

As the foregoing techniques illustrate, current techniques for creating road geometry from probe data generally rely on high frequency trajectory information and high density probe data. In instances in which the probe data is sparse and/or noisy, such as in instances in which probe data is captured in a neighborhood in which traffic moves slowly and may be parked for hours at a time in a driveway or along a roadside, the foregoing techniques may be less successful in accurately generating the road geometry.

Further challenges are presented in instances in which bi-directional road geometry is to be created. A bi-directional road geometry representation is a representation of the road that describes the shape of the road, e.g., a by a curve or polyline, in each direction of travel regardless of whether a median is present. In this regard, bi-directional road geometry is desired in a number of instances including, for example, in conjunction with advanced driver assistance systems (ADAS) navigation functions as well as for geometry inclusion and/or change detection. As illustrated above, a number of existing techniques create the road geometry without reference to heading information, thereby limiting the creation of a bi-directional road geometry. Further, in addition to the challenges to road geometry creation caused by noisy probe data which exhibits positional and/or heading errors, the sparseness of probe data including the gaps and unevenness of probe data and overlapping probe data from adjacent roads increase the difficulty associated with the creation of accurate road geometry, particularly for bi-directional roads.

BRIEF SUMMARY

A method, apparatus and computer program product are provided in accordance with an example embodiment in order to define bi-directional road geometry based upon a plurality of probe points. In this regard, the method, apparatus and computer program product of an example embodiment may rely upon probe data that is sparse, while defining the bi-directional road geometry in an accurate manner. As such, the method, apparatus and computer program product of an example embodiment may be utilized to define bi-directional road geometry for various types of road configurations including bi-directional roads that do not include a dividing median.

In an example embodiment, a method is provided that includes determining an orientation representative of one or more probe points and determining a seed point representative of one or more probe points. The method determines the seed point by determining a constrained weighted center of mass of the one or more probe points. In determining the constrained weighted center of mass, the method limits movement of the constrained weighted center of mass to a direction based upon respective headings of the one or more probe points. The method also includes creating polylines representative of a bi-directional road geometry. In this regard, the method creates the polylines representative of one direction of travel along the bi-directional road geometry by extending a first polyline in the orientation from the seed point and by extending a second polyline in an opposite orientation from the seed point.

The method of an example embodiment additionally creates polylines by creating polylines representative of another direction of travel along the bi-directional road geometry by extending polylines in opposite directions from another seed point representative of one or more other probe points that have an orientation associated with the other direction of travel along the bi-directional road geometry. In an example embodiment, the method limits movement of the constrained weighted center of mass by limiting movement of the constrained weighted center of mass to a direction perpendicular to a median heading of the one or more probe points.

The method of an example embodiment extends the first polyline by extending the first polyline from a first point to a second point. The second point is spaced from the first point by a predefined amount and is disposed in the orientation from the first point. The method of this example embodiment also extends the first polyline by determining an orientation representative of one or more probe points proximate the second point and determining a constrained weighted center or mass of one or more probe points proximate the second point. The constrained weighted center of mass is determined by limiting movement of the constrained weighted center of mass to a direction based upon respective headings of the one or more probe points proximate the second point. The method of this example embodiment further extends the first polyline by repeating extension of the first polyline from the constrained weighted center of mass of the one or more probe points proximate the second point.

In this example embodiment, the method may extend the first polyline in a manner that is dependent upon a count of heading compatible probe points proximate the second point satisfying a minimum point count threshold by determining if a vertex angle from the first point to the constrained weighted center of mass of one or more probe points proximate the second point satisfies a vertex angle threshold and determining that the first polyline has converged in an instance in which the vertex angle fails to satisfy the vertex angle threshold. In an instance in which the count of heading compatible probe points proximate the second point fails to satisfy the minimum point count threshold, the first polyline is considered to have converged at the end of the road. Additionally or alternatively, the method of this example embodiment may extend the first polyline in a manner that is dependent upon a count of heading compatible probe points proximate the second point satisfying a minimum point count threshold by determining if a heading compatible vertex point is located proximate an edge extending from the first point to the constrained weighted center of mass of one or more probe points proximate the second point. In an instance in which a heading compatible vertex point is located proximate the edge, the method of this example embodiment adds the vertex point to the first polyline and determines that the first polyline has converged. However, in an instance in which a heading compatible vertex point is not located proximate the edge, the method of this example embodiment adds the constrained weighted center of mass of one or more probe points proximate the second point to the first polyline and continues to extend the first polyline therefrom.

The method of an example embodiment includes defining a plurality of grid cells. Each grid cell includes at least one probe point. In this example embodiment, the method determines a seed point for each grid cell. The method of this example embodiment also includes determining a heading density for the one or more probe points proximate each respective seed point. In this example embodiment, the method creates the polylines by identifying the seed point from which the first and second polylines will be initially created based upon the heading densities of the seed points.

In another example embodiment, an apparatus is provided that includes at least one processor and at least one memory including computer program code with the at least one memory and the computer program code configured to, with the processor, cause the apparatus to at least determine an orientation representative of one or more probe points and determine a seed point representative of one or more probe points. The at least one memory and the computer program code are configured to, with the processor, cause the apparatus to determine the seed point by determining a constrained weighted center of mass of the one or more probe points. In determining the constrained weighted center of mass, the at least one memory and the computer program code are configured to, with the processor, cause the apparatus to limit movement of the constrained weighted center of mass to a direction based upon respective headings of the one or more probe points. The at least one memory and the computer program code are further configured to, with the processor, cause the apparatus to create polylines representative of a bi-directional road geometry by creating polylines representative of one direction of travel along the bi-directional road geometry by extending a first polyline in the orientation from the seed point and by extending a second polyline in an opposite orientation from the seed point.

The at least one memory and the computer program code are configured to, with the processor, cause the apparatus of an example embodiment to create polylines by creating polylines representative of another direction of travel along the bi-directional road geometry by extending polylines in opposite directions from another seed point representative of one or more other probe points that have an orientation associated with the other direction of travel along the bi-directional road geometry. In an example embodiment, the at least one memory and the computer program code are configured to, with the processor, cause the apparatus to limit movement of the constrained weighted center of mass by limiting movement of the constrained weighted center of mass to a direction perpendicular to a median heading of the one or more probe points.

The at least one memory and the computer program code are configured to, with the processor, cause the apparatus of an example embodiment to extend the first polyline by extending the first polyline from a first point to a second point. The second point is spaced from the first point by a predefined amount and is disposed in the orientation from the first point. The at least one memory and the computer program code are also configured to, with the processor, cause the apparatus of this example embodiment to extend the first polyline by determining an orientation representative of one or more probe points proximate the second point and determining a constrained weighted center or mass of one or more probe points proximate the second point. The constrained weighted center of mass is determined by limiting movement of the constrained weighted center of mass to a direction based upon respective headings of the one or more probe points proximate the second point. The at least one memory and the computer program code are further configured to, with the processor, cause the apparatus of this example embodiment to further extend the first polyline by repeating extension of the first polyline from the constrained weighted center of mass of the one or more probe points proximate the second point.

In this example embodiment, the at least one memory and the computer program code are configured to, with the processor, cause the apparatus to extend the first polyline in an instance in which a count of heading compatible probe points proximate the second point satisfies a minimum point count threshold by determining if a vertex angle from the first point to the constrained weighted center of mass of one or more probe points proximate the second point satisfies a vertex angle threshold and determining that the first polyline has converged in an instance in which the vertex angle fails to satisfy the vertex angle threshold. Additionally or alternatively, the at least one memory and the computer program code are configured to, with the processor, cause the apparatus of this example embodiment to extend the first polyline in an instance in which a count of heading compatible probe points proximate the second point satisfies a minimum point count threshold by determining if a heading compatible vertex point is located proximate an edge extending from the first point to the constrained weighted center of mass of one or more probe points proximate the second point. In an instance in which a heading compatible vertex point is located proximate the edge, the at least one memory and the computer program code are further configured to, with the processor, cause the apparatus of this example embodiment to add the vertex point to the first polyline and to determine that the first polyline has converged. However, in an instance in which a heading compatible vertex point is not located proximate the edge, the at least one memory and the computer program code are configured to, with the processor, cause the apparatus of this example embodiment to add the constrained weighted center of mass of one or more probe points proximate the second point to the first polyline and to continue to extend the first polyline therefrom.

The at least one memory and the computer program code are further configured to, with the processor, cause the apparatus of an example embodiment to define a plurality of grid cells. Each grid cell includes at least one probe point. The at least one memory and the computer program code are also configured to, with the processor, cause the apparatus of this example embodiment to determine a seed point for each grid cell. The at least one memory and the computer program code are further configured to, with the processor, cause the apparatus of this example embodiment to determine a heading density for one or more probe points proximate each respective seed point. The at least one memory and the computer program code are also configured to, with the processor, cause the apparatus of this example embodiment to create the polylines by identifying the seed point from which the first and second polylines will be initially created based upon the heading densities of the seed points.

In a further example embodiment, a computer program product is provided that includes at least one non-transitory computer-readable storage medium having computer-executable program code portions stored therein with the computer-executable program code portions including program code instructions configured to determine an orientation representative of one or more probe points and to determine a seed point representative of one or more probe points. The program code instructions configured to determine the seed point include program code instructions configured to determine a constrained weighted center of mass of the one or more probe points. In determining the constrained weighted center of mass, the program code instructions limit movement of the constrained weighted center of mass to a direction based upon respective headings of the one or more probe points. The computer-executable program code portions also include program code instructions configured to create polylines representative of a bi-directional road geometry. In this regard, the program code instructions configured to create the polylines include program code instructions configured to create polylines representative of one direction of travel along the bi-directional road geometry by extending a first polyline in the orientation from the seed point and extending a second polyline in an opposite orientation from the seed point.

The program code instructions of an example embodiment create polylines by creating polylines representative of another direction of travel along the bi-directional road geometry by extending polylines in opposite directions from another seed point representative of one or more other probe points that have an orientation associated with the other direction of travel along the bi-directional road geometry. In an example embodiment, the program code instructions limit movement of the constrained weighted center of mass by limiting movement of the constrained weighted center of mass to a direction perpendicular to a median heading of the one or more probe points.

The program code instructions of an example embodiment extend the first polyline by extending the first polyline from a first point to a second point. The second point is spaced from the first point by a predefined amount and is disposed in the orientation from the first point. The program code instructions of this example embodiment also extend the first polyline by determining an orientation representative of one or more probe points proximate the second point and determining a constrained weighted center or mass of one or more probe points proximate the second point. The constrained weighted center of mass is determined by limiting movement of the constrained weighted center of mass to a direction based upon respective headings of the one or more probe points proximate the second point. The program code instructions of this example embodiment further extend the first polyline by repeating extension of the first polyline from the constrained weighted center of mass of the one or more probe points proximate the second point.

In this example embodiment, the program code instructions may be configured to extend the first polyline in an instance in which a count of heading compatible probe points proximate the second point satisfies a minimum point count threshold by determining if a vertex angle from the first point to the constrained weighted center of mass of one or more probe points proximate the second point satisfies a vertex angle threshold and determining that the first polyline has converged in an instance in which the vertex angle fails to satisfy the vertex angle threshold. Additionally or alternatively, the program code instructions of this example embodiment may be configured to extend the first polyline in an instance in which a count of heading compatible probe points proximate the second point satisfies a minimum point count threshold by determining if a heading compatible vertex point is located proximate an edge extending from the first point to the constrained weighted center of mass of one or more probe points proximate the second point. In an instance in which a heading compatible vertex point is located proximate the edge, the program code instructions of this example embodiment are configured to add the vertex point to the first polyline and to determine that the first polyline has converged. However, in an instance in which a heading compatible vertex point is not located proximate the edge, the program code instructions of this example embodiment are configured to add the constrained weighted center of mass of one or more probe points proximate the second point to the first polyline and to continue to extend the first polyline therefrom.

The computer program product of an example embodiment also includes program code instructions configured to define a plurality of grid cells. Each grid cell includes at least one probe point. The program code instructions configured to determine the seed point include, in this example embodiment, program code instructions configured to determine a seed point for each grid cell. The program code instructions of this example embodiment also include program code instructions configured to determine a heading density for the one or more probe points proximate each respective seed point. In this example embodiment, the program code instructions configured to create the polylines include program code instructions configured to identify the seed point from which the first and second polylines will be initially created based upon the heading densities of the seed points.

In yet another example embodiment, an apparatus is provided that includes means for determining an orientation representative of one or more probe points and means for determining a seed point representative of one or more probe points. The means for determining the seed point include means for determining a constrained weighted center of mass of the one or more probe points. In determining the constrained weighted center of mass, the movement of the constrained weighted center of mass is limited to a direction based upon respective headings of the one or more probe points. The apparatus also includes means for creating polylines representative of a bi-directional road geometry. In this regard, the means for creating the polylines include means for creating polylines representative of one direction of travel along the bi-directional road geometry by extending a first polyline in the orientation from the seed point and by extending a second polyline in an opposite orientation from the seed point.

BRIEF DESCRIPTION OF THE DRAWINGS

Figure 1:
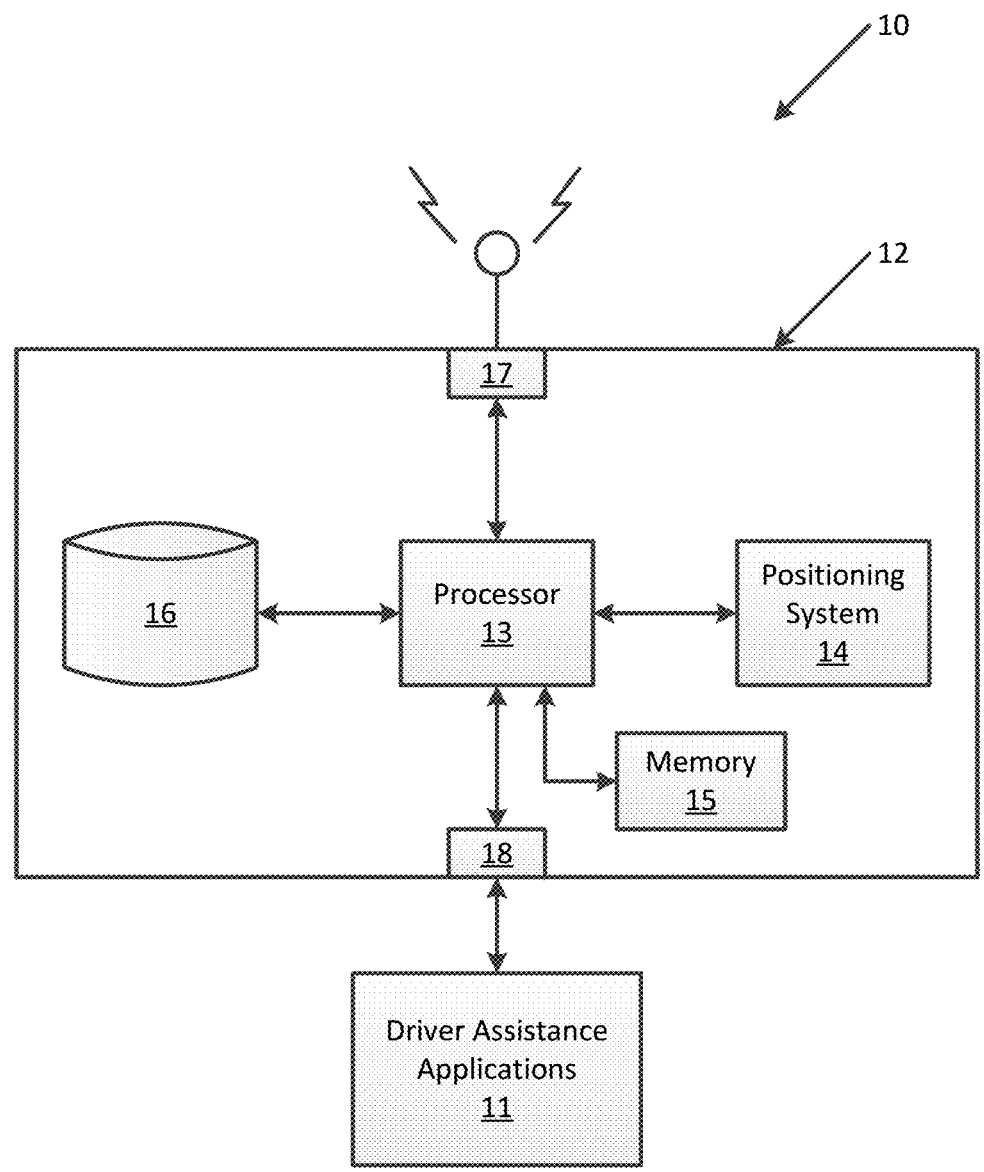
Figure 2:
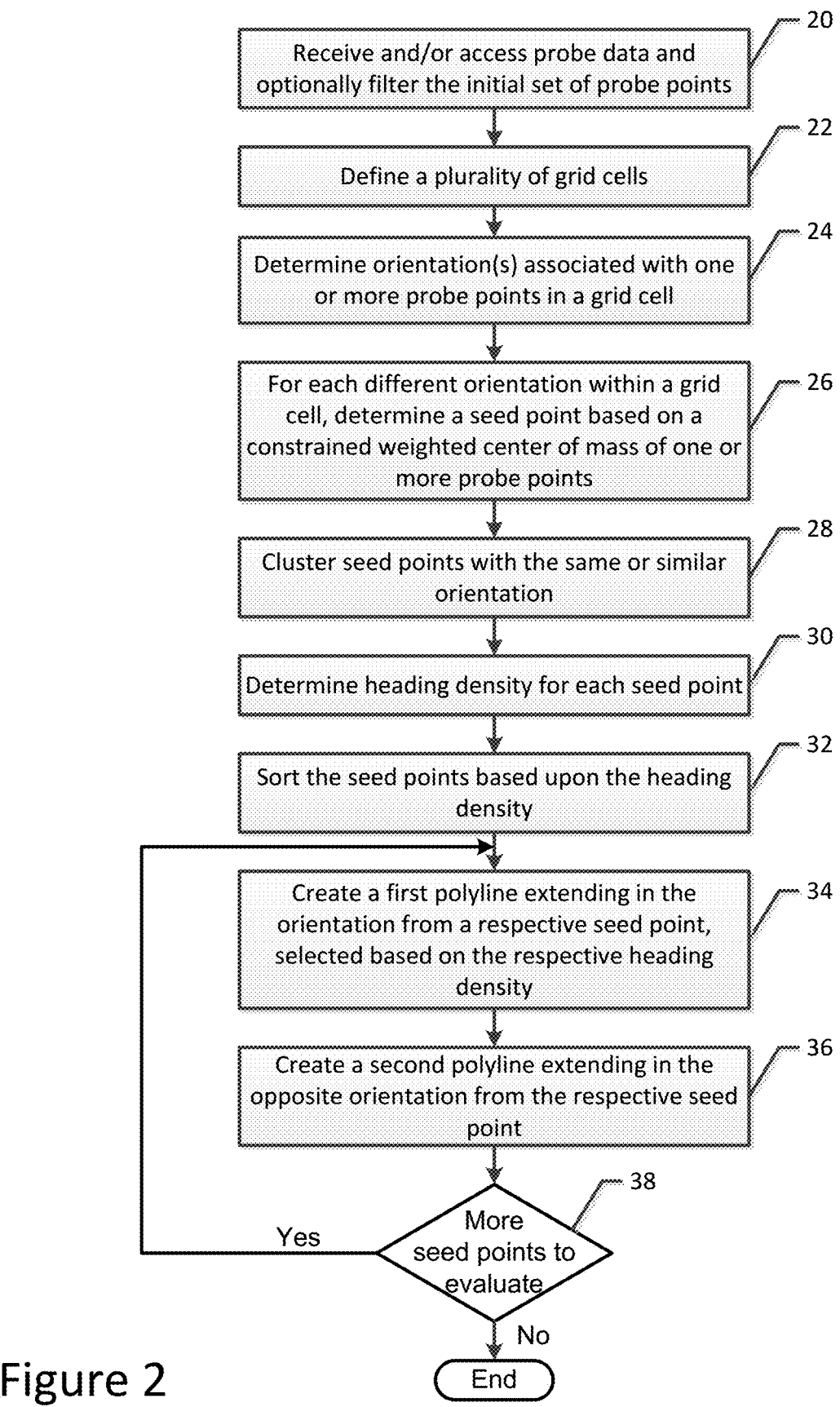
Figure 3:
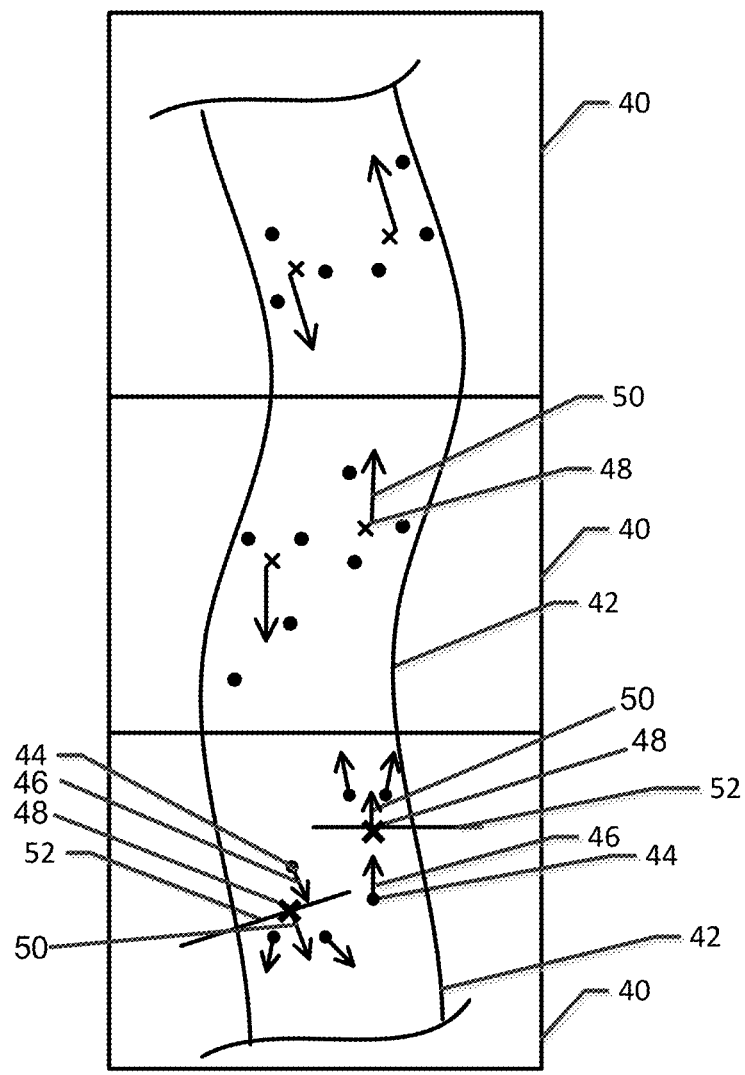
Figure 4:
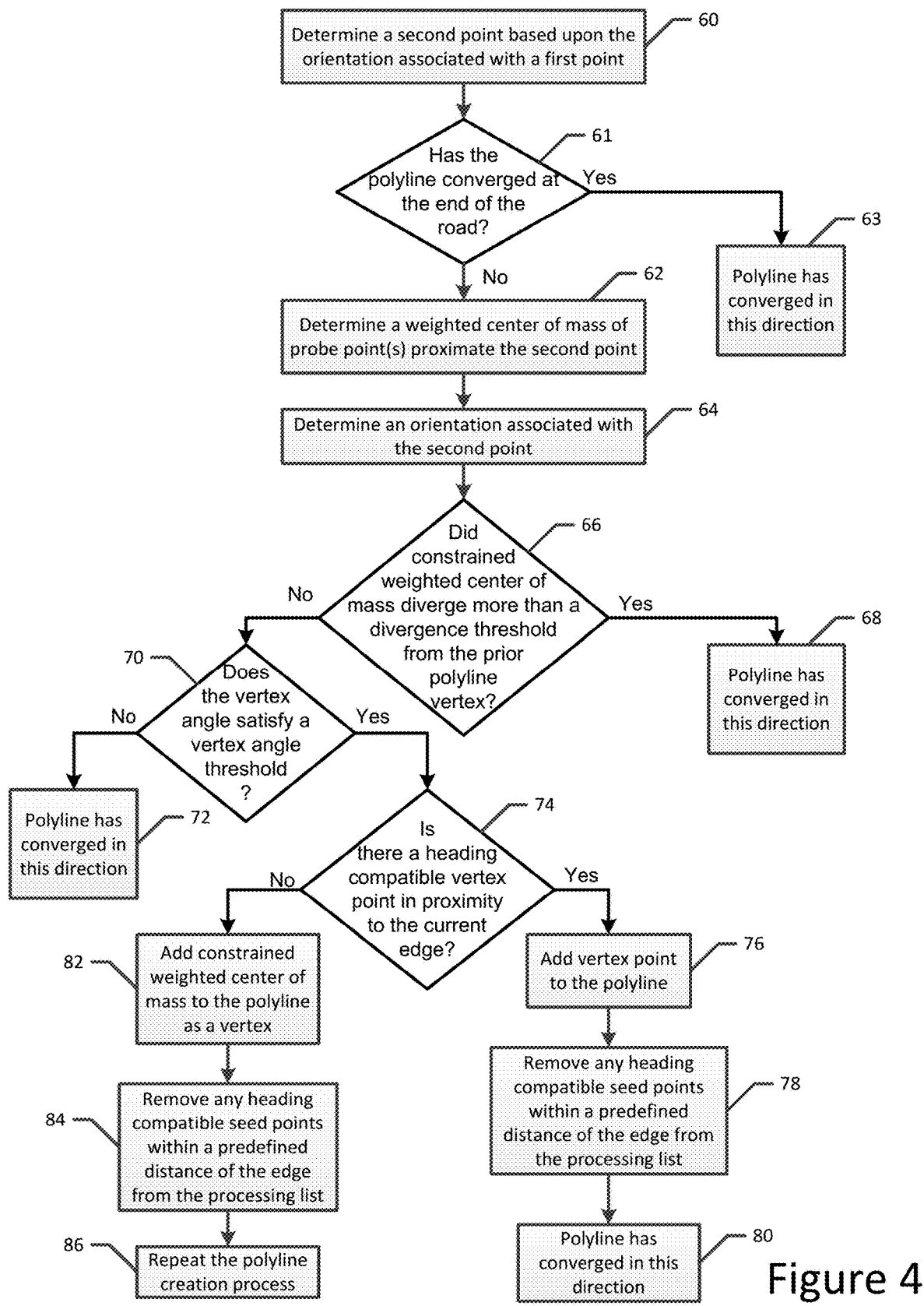
Figure 5:
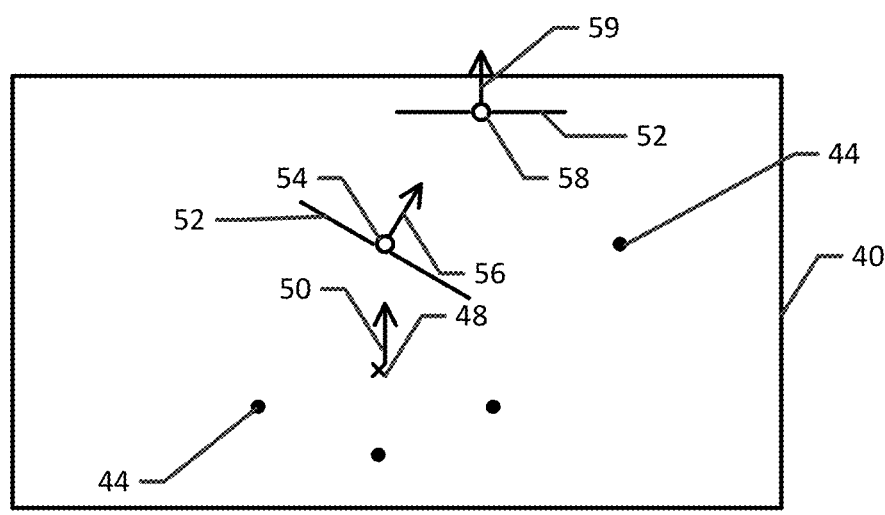
Figure 6:
Figure 7:
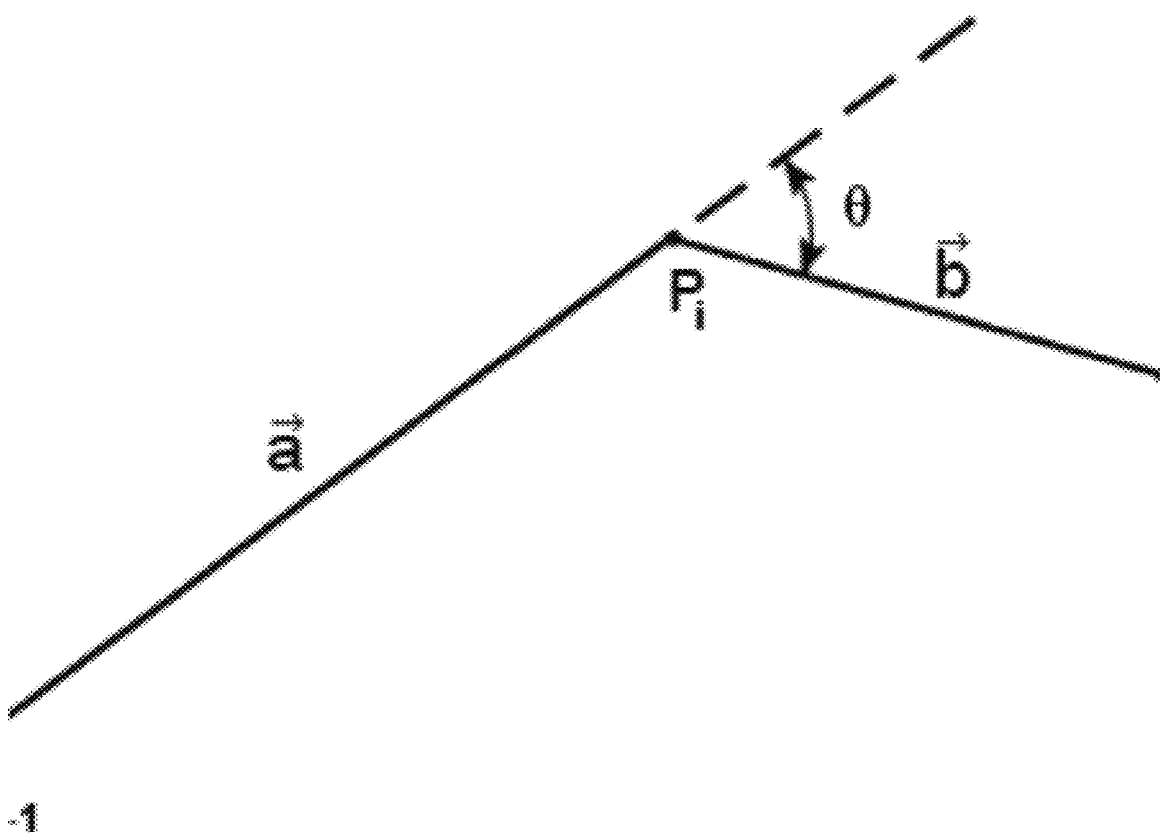
Figure 8:
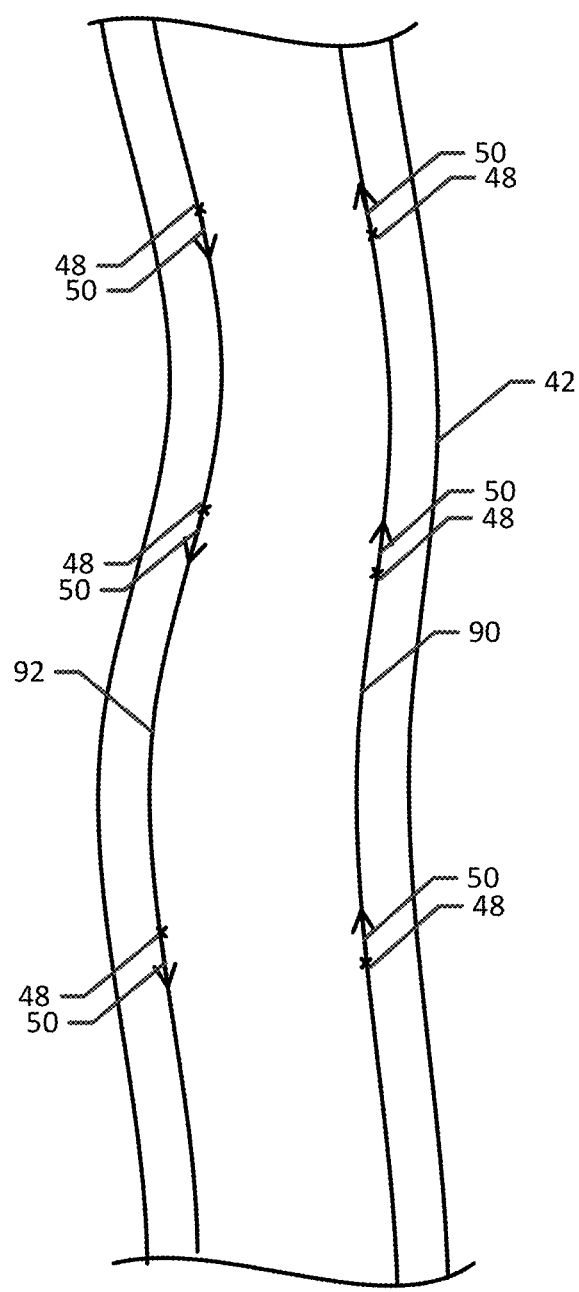

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating the operations performed, such as by the apparatus of FIG. 1, in accordance with an example embodiment of the present invention;

FIG. 3 depicts a plurality of grid cells, each including a plurality of probe points represented by first and second seed points having respective orientations associated therewith in accordance with an example embodiment of the present invention;

FIG. 4 is a flowchart illustrating the operations performed, such as by the apparatus of FIG. 1, in order to extend the first and second polylines in accordance with an example embodiment of the present invention;

FIG. 5 illustrates the extension of a polyline in accordance with an example embodiment of the present invention;

FIG. 6 illustrates a sideways iteration of a constrained center of mass $\mu^x$ that may be considered to have diverged in accordance with an example embodiment of the present invention;

FIG. 7 illustrates a vertex angle for comparison in relation to a predefined vertex angle threshold in accordance with an example embodiment of the present invention; and FIG. 8 depicts the first and second polylines created to represent the bi-directional road geometry in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to create bi-directional road geometry from probe data, such as for mapping and navigational purposes, for road geometry inclusion and/or for change detection. With respect to mapping and navigational purposes, for example, ADAS was developed to improve the comfort, efficiency, safety and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and light detection and ranging (LIDAR) systems.

Some advanced driver assistance systems also use digital map data. These systems are sometimes referred to as map-enhanced ADAS. The digital map data can be used in advanced driver assistance systems to provide information about the road network, road geometry, road conditions and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The digital map data that is utilized by map-enhanced ADAS generally represents a road network with a link geometry including a plurality of polylines. For a bi-directional road, map-enhanced ADAS may include different sets of data for each different direction of travel along the road. For example, a map-enhanced ADAS may include data defining the lanes of travel extending in each different direction of travel along the road. Thus, a map-enhanced ADAS may advantageously represent a bi-directional road network with separate sets of polylines representing each different direction of travel along the road such that the different sets of data for each different direction of travel along the road may be associated with a respective set of polylines.

The probe data from which the bi-directional road geometry is created may be collected by a variety of probe sources including those probe sources that provide sparse probe point data and/or probe sources that are slowly moving so as to have increased uncertainty associated with the trajectory thereof. As a result, the method, apparatus and computer program product of an example embodiment are configured to create bi-directional road geometry for a variety of different types of bi-directional roads including bi-directional roads in a neighborhood or roads that are otherwise traveled at a relatively slow rate of speed which may otherwise be difficult to map. For example, the method, apparatus and computer program product of an example embodiment are configured to create road geometry for bi-directional roads regardless of whether the roads include a median or other divider.

The apparatus of an example embodiment may be embodied by a variety of computing devices. For example, the apparatus may be embodied by a server, a personal computer, a computer workstation, a laptop computer, a plurality of networked computing devices or the like. In an example embodiment depicted in FIG. 1, a map-enhanced ADAS architecture 10 includes driver assistance applications 11 and the apparatus 12 that embodies a map and positioning engine (MPE). The MPE is shown in FIG. 1 as a standalone module; however, it is understood that the MPE may be distributed into multiple packages and/or integrated into other device packages, such as a sensor package. The MPE of the illustrated embodiment includes a processor 13, a positioning system 14, a memory 15, a geographic database 16, a communications system 17, and an in-vehicle data bus interface 18. The MPE may also include other hardware, software, and/or firmware, such as a power source.

The processor 13 receives inputs from the positioning system 14, the geographic database 16, the communication system 17, the in-vehicle data bus interface 18, and other sources. The processor then processes the inputs using application software programs. In some embodiments, the processor (and/or co-processors or any other processing circuitry assisting or otherwise associated with the processor) may be in communication with the memory device 15 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 12 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 13 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 13 may be configured to execute instructions stored in the memory device 15 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication system 17 may be any means such as a device or circuitry embodied in either hardware or a combination of hardware and software that is configured to receive and/or transmit data from/to other electronic devices in communication with the apparatus, such as by being configured to receive data from an in-vehicle global positioning system (GPS), in-vehicle navigation system, a personal navigation device (PND), a portable navigation device or other in-vehicle data collection system. In this regard, the communication system may include, for example, an antenna (or multiple antennas) and supporting hardware and/or software for enabling communications with a wireless communication network. Additionally or alternatively, the communication system may include the circuitry for interacting with the antenna(s) to cause transmission of signals via the antenna(s) or to handle receipt of signals received via the antenna(s). In some environments, the communication system may alternatively or also support wired communication.

The processor 13 of the illustrated embodiment is configured to provide outputs to the driver assistance applications 11 via the in-vehicle data bus interface 18 and a data bus. In an example embodiment, the in-vehicle data bus interface and the data bus are a Controller-Area Network (CAN) interface and a CAN bus, which are designed for automotive applications. The driver assistance applications may include adaptive headlight aiming, adaptive cruise control, obstruction detection, obstruction avoidance, collision avoidance, adaptive shift control, autonomous driving and others.

The positioning system 14 may utilize GPS-type technology, a dead reckoning-type system, or combinations of these or other systems, which are known in the art. The positioning system may also include suitable sensing devices that measure the traveling distance speed, direction, orientation, and so on. For example, the positioning system may include a global positioning system (GPS) and a gyroscope. The positioning system provides an output signal to the processor 13. Some of the application software programs that run on the processor use the output signal from the positioning system to determine the location, direction, orientation, etc., of the MPE.

The geographic database 16 is designed for ADAS applications. Like a navigation system geographic database, the geographic database contains data about roads and intersections in a geographic region. For example, the geographic database contains at least one database record (also referred to as "entity" or "entry") for each road segment (also referred to as a link). The geographic database may include higher quality, that is, more accurate, data than the data typically contained in a navigation system geographic database. For example, with respect to road geometry, the data in the geographic database may be more accurate with respect to longitude, latitude, and/or altitude. Also, the starting and stopping locations of tunnels may be more accurately specified in the geographic database. Further, the data in the geographic database may be more accurate with respect to derived information, such as curvature.

The geographic database 16 may also include more kinds of data (e.g., more kinds of attributes) than the data typically contained in a navigation system geographic database. For example, the geographic database may include data about road objects, such as signs and crosswalks, including their positions along a road segment, sign object type, and sign text. Further details regarding an ADAS architecture 10 of an example embodiment are provided by US patent application Ser. No. 14/622,026 filed Feb. 13, 2015, the contents of which are incorporated herein in their entirety by reference.

In order to create bi-directional road geometry from probe data as represented by a plurality of probe points, reference is now made to FIG. 2 in which the operations performed, such as by the apparatus 12 of FIG. 1, are depicted. In this regard, the apparatus of an example embodiment includes means, such as the processor 13, the communication system 17 or the like, for receiving probe data and/or means, such as the processor, the memory 15, the communication system or the like, for accessing probe data. See block 20. The probe points generally provide an indication of the position at which the probe data was collected, the rate at which the probe source that collected the probe data was moving and the orientation, e.g., heading vector as may be derived from the heading angle, or trajectory with which the probe source is moving upon collecting the probe data. The probe data may be collected by a variety of probe sources including mobile telephones, such as smart phones, GPS units, navigation systems and the like. The probe data may be provided in advance of or concurrent with the creation of the bi-directional road geometry. Although all probe data may be utilized in some embodiments, the apparatus of an example embodiment includes means, such as the processor or the like, for filtering the probe data. In this regard, the processor of an example embodiment may be configured to filter out probe data that was captured by a probe source moving at less than a predefined rate, such as at a rate of less than 5 kilometers per hour, probe data that satisfies criteria associated with noisy data and/or probe data having a heading that is clearly erroneous or otherwise anomalous, such as defined by predefined criteria.

The apparatus 12 also includes means, such as the processor 13 or the like, for determining one or more seed points representative of one or more probe points. A listing of the seed points may be maintained, such as by memory 15. In order to facilitate parallel processing of the probe data, the apparatus of an example embodiment may include means, such as the processor or the like, for defining the plurality of grid cells. See block 22 of FIG. 2. As shown in FIG. 3, each grid cell 40 may be the same size and shape, such as a square tile, for example, having a side length that is based upon the width of the road 42, such as by being a multiple of the road width, e.g., two or three times the width of the road. In an example embodiment, each grid is a square tile having a side length of 25 or 30 meters. Each grid cell includes at least one probe point 44, such as shown in FIG. 3 in which each grid cell includes a plurality of probe points.

In this example embodiment, the apparatus 12 also includes means, such as the processor 13 or the like, for determining the orientation(s) associated with one or more probe points in a grid cell. See block 24 of FIG. 2. The orientation therefore relates to the local orientation of a path of travel along the corresponding portion of the road and is utilized as described below in the search for additional probe points to define a road segment. By way of example, the orientation of the probe points 44 in FIG. 3 is shown by directional arrows 46. Since the road may support traffic flow in at least two different directions, such as two opposed directions in regards to a bi-directional road or two or more directions that intersect at 90° or some other angle in regards to the intersection of two or more roads, the probe points may be associated with two or more different orientations, each of which may be separately determined in accordance with an example embodiment of the present invention. For example, FIG. 3 depicts the probe points along the right-hand side of the road having an upward orientation and the probe points along the left-hand side of the road having a downward orientation.

In an example embodiment, the apparatus 12, such as the processor 13 or the like, is configured to determine a first orientation of the probe points by determining the median heading vector of the probe points within a respective grid cell. For example, the apparatus, such as the processor, of an example embodiment is configured to determine the median components, such as the median x-component and the median y-component, of the respective components of the heading vectors of the probe points within the respective grid cell. The first orientation of the probe points is therefore defined by the median heading vector, such as may be formed of the median x-component and the median y-component subject to each probe heading vector having first been normalized to a fixed length, e.g., 1.

In this example embodiment, the apparatus 12, such as the processor 13, may be also configured to identify the probe points within the respective grid cell having a heading vector that differs from the first orientation by at least a predefined threshold, such as by differing from the first orientation by more than +/−30°. The apparatus, such as the processor, of this example embodiment is also configured to determine a second orientation of the probe points having a heading vector that differs from the first orientation by at least the predefined threshold. For example, the apparatus, such as the processor, of this example embodiment is configured to determine the median components, such as the median x-component and the median y-component, of the respective components of the heading vectors of the probe points within the respective grid cell having a heading vector that differs from the first orientation by at least the predefined threshold. The second orientation of the probe points is therefore defined by the median heading vector, such as may be formed of the median x-component and the median y-component, of the probe points having a heading vector that differs from the first orientation by at least the predefined threshold. The first and second orientations may therefore identify the opposite directions of travel along a bi-directional road. This process may be repeated to determine any number of orientations, such as by successively determining the median heading vector of the probe points that have a heading vector that differs from the orientations that have been previously determined, such as the first and second orientations, by at least a predefined threshold. As such, the orientation associated with the direction of travel along an intersecting road may also be determined.

The orientation(s) associated with one or more probe points in a grid cell may be determined in other manners. For example, the apparatus 12, such as the processor 13, of an example embodiment may alternatively be determined by the use of a principal component analysis or a least median square technique, as separately described below. Principal component analysis is a point-based technique, while the least median square technique may be applied to points and/or probe headings.

Principal component analysis is a dimensionality reduction technique. In an embodiment that utilizes a weighted principal component analysis to determine the orientation, the apparatus 12, such as the processor 13, is configured to determine the covariance matrix for the neighborhood of probe points around location x, such as the probe points within a predefined radius of location x, as follows:

$$\Sigma^x = (\sigma_{jk}^x) \text{ whose } (j,k) \text{ entry is } \sigma_{jk}^x = \Sigma_{i=0}^n w_i (X_{ij} = \mu_j^x)(X_{ik} = \mu_k^x)$$

In the covariance matrix defined above, $\mu^x$ is the mean (or media for robustness) location around x and the weights $w_i$ are defined as $$w_i = \frac{K_H(X_i - x)}{\sum_{i=0}^n K_H(X_i - x)}.$$

The first eigenvector $\Sigma^x$, that is the eigenvector for which the corresponding eigenvalue is the largest, is the first local principal component and defines the first orientation of the probe points within a grid cell. The principal component analysis may be repeated to determine any number of orientations, such as by successively determining the orientation of the probe points that have a heading vector that differs from the orientation(s) that have been previously determined, such as the first orientation during a determination of a second orientations or the first and second orientations during a determination of a third orientation. Other techniques for performing principal component analysis (PCA) and dimensionality reduction are also possible, such as, for example, PCA by singular value decomposition (SVD).

In another embodiment in which the apparatus 12, such as the processor 13, is configured to utilize the least median of squares technique for probe points to determine the orientation, the apparatus, such as the processor, is configured to run a plurality of trials k. For each trial k, two probe points are randomly selected to define a line $l_k$ through them. The apparatus, such as the processor, then determines the residuals $r_i$, that is, the projection distance, to the line $l_k$ for each probe point i. The apparatus, such as the processor, of this example embodiment retains the point pair trial $\hat{\theta}_k$ for which the median $r_i^2$ is minimized as follows:

$$\underset{\hat{\theta}}{\text{minimize}} \, \underset{i}{\text{med}} \, r_i^2.$$

The point pair trial $\hat{\theta}_k$ for which the median $r_i^2$ is minimized then serves to define a robust estimate for the orientation, such as the first orientation, or shape of the probe points within the grid cell. In an example embodiment, the plurality of trials k may require the consideration of every probe pair combination. However, the sample size may alternatively be defined based upon the desired probability, e.g., 95%, of selecting a good subsample. In this example embodiment and for a subsample size of n=2, that is the selection of 2 points for every trial, and based on the desired degree of robustness, that is, the fraction of outlier, e.g., up to 50%, 11 random unique subsample pair selections may be required. As before, the least median of squares technique may be repeated to determine any number of orientations, such as by successively determining the orientation of the probe points that have a heading vector that differs from the orientation(s) that have been previously determined.

In another embodiment in which the apparatus 12, such as the processor 13, is configured to utilize the least median of squares technique to determine the orientation from heading vectors, the apparatus, such as the processor, is configured to run a plurality of trials k. For each trial k, one probe vector is randomly selected to define a sample heading vector $\hat{\theta}_k = v_k$. The apparatus, such as the processor, then determines the residuals $r_i$ as e.g. the inner product or angular difference between the sample heading vector $v_k$ and the probe heading for each probe point i. The apparatus, such as the processor, of this example embodiment retains the heading vector trial $\hat{\theta}_k$ for which the median $r_i^2$ is minimized as follows:

$$\underset{\hat{\theta}}{\text{minimize}}\, \underset{i}{\text{med}}\, r_i^2.$$

The heading vector trial $\hat{\theta}_k$ for which the median $r_i^2$ is minimized then serves to define a robust estimate for the orientation, such as the first orientation, or shape of the probe points within the grid cell. The heading vector based least median of squares analysis may be repeated to determine any number of orientations, such as by successively determining the orientation of the probe points that have a heading vector that differs from the orientation(s) that have been previously determined, such as the first orientation during a determination of a second orientations or the first and second orientations during a determination of a third orientation.

In addition to the orientation, the least median of squares technique may define a scale estimate and a standard deviation of the probe points perpendicular to the first orientation which indicates the local spread and noise level, respectively, of the probe points. In this regard, the scale estimate $s^0$ may be defined as follows: $s^0 = 1.4826 * (1.0 + 5.0/(n-p)) * \sqrt{\min(\text{med}(r_i^2))}$ wherein p is the number of parameters, n is the number of probe points, $(1.0+5.0/(n-2))$ is a finite sample correction factor and 1.4826 represents the asymptotic correction for normal errors, calculated by $1/\Phi^{-1}(0.75) = 1.4826$, so as to achieve the same efficiency as a least squares in the presence of only Gaussian noise. $\Phi(x)$ denotes the standard normal cumulative distribution function which describes the probability that a real-valued random variable x with a given probability distribution, such as a normal probability distribution, will be found to have a value less than or equal to x. Thus $\Phi^{-1}(x)$ is the inverse standard normal cumulative distribution function. In addition, the standard deviation may be estimated by:

$$\sigma^* = \sqrt{\frac{\sum_{i=0}^{n} w_i r_i^2}{\sum_{i=0}^{n} w_i - p}} \text{ where } w_i = \begin{cases} 1 & \text{if } |r_i/s^0| \le 2.5 \\ 0 & \text{otherwise} \end{cases}.$$

The apparatus 12 also includes means, such as the processor 13 or the like, for determining a seed point for each grid cell. See block 26 of FIG. 2. In an example embodiment, the apparatus, such as the processor, is configured to determine a respective seed point for each different orientation of the probe points within the grid cell. For example, in an embodiment in which first and second orientations are determined for the probe points within a grid cell, such as first and second orientations representative of the opposite directions of travel along the bi-directional road geometry, first and second seed points associated with the first and second orientations, respectively, of the probe points may be determined. In this manner, for bi-directional road geometry, seed points may be created for each direction of travel, located proximate to the road center in each direction of travel and with respective heading values representative of the direction of travel at the respective seed point locations.

In order to determine a seed point, the apparatus 12 of an example embodiment includes means, such as the processor 13 or the like, for determining a constrained weighted center of mass of one or more probe points. In order to determine the constrained weighted center of mass, the apparatus, such as the processor, may be configured to identify the median probe point within a respective grid cell. A predefined radius $R_{SCM}$ may be defined around the median probe point and the probe point(s) designated i=1, 2, ... n within a circle having the radius $R_{SCM}$ about the median probe point may be identified. The radius $R_{SCM}$ may be predefined in various manners, but is two or three road widths, such as 50 meters, in some embodiments. The constrained weighted center of mass may be determined in various manners, but, in an example embodiment is determined in an iterative fashion utilizing a mean shift technique that repeatedly determines the weighted center of mass with movement of the weighted center of mass being constrained until the weighted center of mass converges. In this regard, movement of the weighted center of mass is constrained by limiting movement of the constrained weighted center of mass to a direction based upon respective headings of one or more probe points. For example, movement of the weighted center of mass may be constrained by limiting movement of the constrained weighted center of mass to a direction perpendicular to the median heading of the one or more probe points, such as by limiting movement of the constrained weighted center of mass to a direction perpendicular to a respective orientation, such as the first orientation.

In this regard, the mean shift technique is a non-parametric feature-analysis technique for locating the maxima of a density function and may be mathematically represented as follows:

$$x_{(k+1)} = \mu(x_{(k)}) \text{ where } \mu(x) = \frac{\sum_{i=0}^{n} K_H(X_i - x) X_i}{\sum_{i=0}^{n} K_H(X_i - x)}$$

is repeated until x converges where $x_i$ represents the location of probe point i in the neighborhood around x defined by radius $R_{SCM}$.

In the foregoing function, x is the location of the median probe point, e.g., in the first iteration $x_{(o)} = x$ is the starting point which is the location of the median probe point x, and $K_H(\cdot)$ is a Gaussian kernel function $$K_H(\cdot) = e^{-\frac{1}{2}\left(\frac{(X_i - x)}{h}\right)^2}$$

and h is the bandwidth which is the radius $R_{SCM}$. The constrained weighted center of mass around point x may also be referenced as $\mu^x$. Although the weighting is performed using a Gaussian kernel function in the foregoing example, other kernels may be utilized in order to perform different weighting including, for example, a uniform convolution kernel, an Epanechnikov convolution kernel or a biweight convolution kernel. The iterative computation of the constrained weighted center of mass is repeated with the movement of the constrained weighted center of mass being limited, such as to a direction perpendicular to a respective orientation, such as the first orientation, until the weighted center of mass converges, that is, until the change in location of the constrained weighted center of mass from $x_k$ to $x_{k+1}$ is less than a predefined threshold. With reference to FIG. 3, for example, the movement of the constrained weighted center of mass is limited to movement along line 52, which is perpendicular to the first orientation as indicated by directional arrow 50.

In this regard, following the determination of a new location $x_{(k+1)}$ that is positioned in a direction perpendicular to a respective orientation, such as the first orientation, from the prior location $x_{(k)}$, the probe points within the same predefined radius $R_{SCM}$ of the new location $x_{(k+1)}$ are identified. The constrained weighted center of mass of the new set of probe points proximate the new location $x_{(k+1)}$ is identified. The change in location between the constrained weighted center of mass of the probe points proximate the new location $x_{(k+1)}$ is then compared to the constrained weighted center of mass of the probe points proximate the prior location $x_{(k)}$. If the change in location exceeds the predefined threshold, the iterative process continues. However, if the change in location is less than the predefined threshold, the constrained weighted center of mass is considered to have converged and the iterative process is concluded.

Once the constrained weighted center of mass has converged, the resulting constrained weighted center of mass is defined as a seed point for the respective grid cell 40. In this regard, a constrained weighted center of mass may be determined and may define a respective seed point for each different orientation of the probe points within the grid cell. In an instance in which first and second orientations are defined for the probe points within the grid cell, the foregoing process may be repeated to determined first and second constrained weighted centers of mass that, in turn, define first and second seed points with the constrained weighted centers of mass being limited to only movement in a direction perpendicular to the first and second orientations, respectively.

With reference to FIG. 3, the first and second seed points 48 for each respective grid cell are denoted by an "X" and the orientation of each seed point is represented by a corresponding directional arrow 50. Although the constrained weighted center of mass is based upon the probe points within the grid cell, the constrained weighted center of mass may, in some instances, be determined to be outside of the respective grid cell.

The apparatus 12 of an example embodiment optionally includes means, such as the processor 13 or the like, for clustering two or more seed points in order to reduce the number of seed points. See block 28 of FIG. 2. In this regard, the apparatus, such as the processor, is configured to cluster seed points within the same grid cell having the same orientation and/or orientations that differ by no more than a predefined threshold. By clustering seed points, the risk of creating overlapping road geometry from seed points having similar locations and headings is reduced. The apparatus, such as the processor, may employ various clustering techniques, for example, a re-gridding of the seed points in which the grid cells for the clustered seed points are combined into a re-gridded cell with the median location and the median orientation of the seed points that have been clustered being retained for the seed point for the re-gridded cell. While re-gridding the seed points, the grid cell size is relatively small, such as only about a lane width of a road to ensure or at least increase the likelihood that seed points are retained in each direction of travel.

In an example embodiment, the apparatus 12 also include also optionally includes means, such as the processor 13 or the like, for determining the heading density for the probe points proximate each seed point, such as for the probe points located within a circle having a predefined radius R centered about each seed point. See block 30 of FIG. 2. The heading density indicates the number of probe points having a compatible heading, that is, the number of probe points having the same heading or a heading that is within a predefined angular threshold with respect to the local road heading estimate, such as represented by the seed point heading. The probe headings may therefore be compared to the seed point headings. The apparatus of this example embodiment is also configured to include means, such as the processor or the like, for sorting the seed points based upon the heading density. See block 32. In this regard, the seed points may be sorted so as to be arranged in a list in order of decreasing heading density from the seed point having the highest density to the seed point having the lowest heading density.

The apparatus 12 of an example embodiment also include means, such as the processor 13 or the like, for creating a polylines, such as first and second polylines. In this regard, the first polyline is created so as to extend in the first orientation, such as determined in the manner described above, from the first seed point. See block 34 of FIG. 2. Likewise, the apparatus, such as the processor, of an example embodiment creates a second polyline so as to extend in the second orientation, such as in the opposite direction, from the first seed point. See block 36. Since the two polylines extend from the same seed point, but in opposite directions, the first and second polylines can be joined to form one contiguous polyline, e.g., by first reversing the order of the vertices of the second polyline and appending the vertices of the first polyline. Additional polylines may also be created in an embodiment in which the probe points of a grid cell have been associated with two or more different orientations, each associated with a corresponding seed point with a heading according to the respective orientations, such as for bi-directional road geometry (such as the two seed points 48 denoted by an "X" in FIG. 3) or in an instance in which roads intersect. As also shown in FIG. 3, the apparatus of an example embodiment additionally includes means, such as the processor or the like, for determining whether there are more seed points to evaluate for purposes of creating polylines with the seed points being evaluated in an order based upon the respective heading densities until all seed points identified by the listing have been included within a respective polyline. See block 38 of FIG. 2.

The polylines may be created in various manners, but, in an example embodiment, the apparatus 12, such as the processor 13, is configured to create the polylines in the manner set forth by FIG. 4. In this example embodiment in which a polyline is extended from a respective seed point, the seed point defines a first point and the apparatus, such as the processor, is configured to determine a second point based upon the orientation associated with the first point, that is, the seed point. See block 60 of FIG. 4. In this regard, the second point is spaced from the first point by a predefined amount s, such as the radius $R_{SCM}$ or another value, and is disposed in the orientation from the first point, that is, in the orientation associated with the seed point. In this regard, the apparatus, such as the processor, may be configured to define the second point as follows: $x_{i+1} = x_i + s\gamma^x$ wherein $\gamma^x$ defines the orientation associated with the first point. As shown in block 61, the apparatus, such as the processor, of an example embodiment is also configured to determine if the polyline has converged at the end of a road, such as by determining if there are any additional heading compatible probe points to consider, that is, whether there are any remaining probe points that are heading compatible with respect to the orientation of the first point within a region about the second point, such as within a predefined radius centered about the second point. In an instance in which the polyline is determined to have converged at the end of a road, such as in an instance in which there are no additional heading compatible probe points to consider, the polyline will be considered to have converged in this direction. See block 63 of FIG. 4. The polyline creation process is then repeated so as to create a polyline that extends from the respective seed point, but in the opposite orientation.

In the foregoing example, the polyline is considered to have converged in one direction in an instance in which there are no additional heading compatible probe points to consider. In other embodiments, however, all additional heading compatible probe points need not be evaluated prior to considering the polyline to have converged and, instead, a minimum point count threshold may be established with the polyline being considered to have converged in one direction in an instance in which the count of additional heading compatible probe points to be considered fails to satisfy the minimum point count threshold, such as by being less than the minimum point count threshold. Thus, in an instance in which the minimum point count threshold is 3, the polyline will be considered to have converged in one direction in an instance in which only 0, 1 or 2 additional heading compatible probe points remain to be considered.

In an instance in which the polyline is determined not to have converged at the end of a road, such as in an instance in which there are additional heading compatible probe points to consider, and once the second point has been defined, the apparatus 12 includes means, such as the processor 13 or the like, for determining the constrained weighted center of mass of one or more probe points proximate the second point. In this regard, the apparatus, such as the processor, may be configured to determine the constrained weighted center of mass of the probe points proximate the second point in the same manner in which the constrained weighted center of mass of the probe points in a grid cell was initially determined, with movement of the weighted center of mass being limited to a direction perpendicular to the orientation associated with the first point, where initially the first point is the seed point. See block 62. The apparatus also includes means, such as the processor or the like, for determining the orientation representative of one or more probe points proximate the constrained weighted center of mass of the probe points proximate the second point that are heading compatible with respect to the orientation associated with the first point. See block 64. As shown in FIG. 5, for example, the constrained weighted center of mass that is defined based upon the second point may be shown as an open circle 54 and the orientation associated therewith may be depicted by a directional arrow 56. Movement of the second point may be limited to the direction perpendicular to its orientation as shown by line 52.

The apparatus 12 of an example embodiment also includes means, such as the processor 13 or the like, for determining if the constrained weighted center of mass of the probe points diverged. Divergence will have occurred in an instance in which the weighted center of mass of the probe points iterated by more than a predefined divergence threshold $a_{thresh}$ from the prior polyline vertex, such as the first point. See block 66 of FIG. 4. As described above, the iterative movement of the constrained weighted center of mass is limited to a direction perpendicular to the orientation of the first point. Thus, in an instance in which the iterative movement is within the road, the iteration distance d will be at most only slightly larger than the step size s, namely, $a_{thresh} = \sqrt{s^2 + (\sigma^*)^2}$ in which $\sigma^*$ is the point spread approximating about half the road width in the current heading direction. However, if the iteration distance d is significantly larger than the step size s, e.g., $d > \sqrt{s^2 + (\sigma^*)^2}$, the constrained weighted center of mass is considered to have diverged, such as may occur near ramp bifurcations in which a sideways iteration may inadvertently move onto another road segment. In an instance in which the constrained weighted center of mass is considered to have diverged, the polyline is considered to have converged in this direction and the second point is not added as a vertex of the polyline. See block 68 of FIG. 4. For parallel roads, such as discussed below in conjunction with FIG. 6, sideways divergence may cause gaps in the road geometry. However, gaps are not usually created as there are frequently additional seed points ahead on the road that will resume road geometry creation for the road, and further since the polylines will extend in both directions, the polylines are likely to snap onto the remaining vertex for the diverging polyline. The polyline creation process is then repeated so as to create a polyline that extends from the respective seed point, but in the opposite orientation.

With reference to FIG. 6, the polyline is depicted for a ramp that approaches a freeway. In the illustrated example, the second point as designated SP is spaced by an offset distance s from the first point $P_i$. In an instance in which the second point SP iterates sideways to a point designated $\mu^x$ during the mean shift step off the ramp lane until the constrained center of mass $\mu^x$ converges near the freeway road center. This sideways iteration is due to the inclusion of high density heading compatible probes from the freeway within the search radius of mean shift around the second point SP. Since the ramp road segment has a road width of about $2\sigma^*$, it is known that the sideways iteration should not be more than about half the road width in the direction of travel, e.g., $\sigma^*$, to stay on the road ramp. In the illustrated example, however, the relatively long sideways iteration distance from SP to $\mu^x$ attributable to the wide freeway may have introduced a kink at $P_i$. By employing the divergence criteria, the potential introduction of such a kink may be avoided as well as the potential introduction of incorrect road geometry may be avoided, such as in the example of FIG. 6 where without the divergence criteria, the polyline would have continued to advance onto the freeway.

In an instance in which the constrained weighted center of mass did not diverge by more than the divergence threshold, the apparatus 12 of an example embodiment includes means, such as the processor 13 or the like, for determining whether the vertex angle satisfies a predefined vertex angle threshold, such as by being less than the predefined vertex angle threshold. See block 70 of FIG. 4. In this regard, the vertex angle is defined as the angle from the immediately prior vertex of the polyline, e.g., the first point, to the constrained weighted center of mass. In relation to FIG. 7, for example, the vertex angle is defined as the angle between the previous edge vector $\vec{\beta}$ from the previous point $P_{i-1}$ to the current point $P_i$ and the direction of the new candidate edge vector $\vec{b}$ to the new vertex candidate $\mu^x$. In an instance in which there is no previous edge, such as an instance in which $P_i$ is the seed point, $\vec{\beta}$ is defined as the seed point orientation $\gamma^x$. By requiring the vertex angle to satisfy the predefined vertex angle threshold, such as by being less than the predefined vertex angle threshold, the polyline that is created can be insured to be smooth without kinks. In an instance in which the predefined vertex angle threshold is not satisfied, the polyline is considered to have converged in this direction and the second point is not added as a vertex of the polyline. See block 72 of FIG. 4. Instead, the polyline creation process is repeated so as to create a polyline that extends from the respective seed point, but in the opposite orientation.

However, in an instance in which the predefined vertex angle threshold is satisfied, the apparatus 12 of an example embodiment includes means, such as the processor 13 or the like, for determining whether there is a heading compatible vertex point in proximity to the current edge of the polyline, that is the edge extending from the first point to the constrained weighted center of mass of one or more probe points proximate the second point. See block 74 of FIG. 4. In this regard, a heading compatible vertex point is a vertex point of another polyline, such as a polyline previously created so as to extend from another seed point, that is associated with a heading that is equal to or, in some embodiments, within a predefined range of the heading associated with first or second point. For any such heading compatible vertex points, the apparatus, such as the processor, may be configured to determine proximity to the current edge in various manners, such as by identifying one or more heading compatible vertex points that are within a predefined distance from any point along the current edge of the polyline.

In an instance in which a heading compatible vertex point is identified to be in proximity to the current edge, the apparatus 12 of an example embodiment includes means, such as the processor 13 or the like, for adding the vertex point, but not the second point which is discarded, to the polyline that is currently being constructed, thereby snapping the polyline to the previously created polyline that includes the heading compatible vertex point. See block 76 of FIG. 4. In an example embodiment, the apparatus also includes means, such as the processor or the like, for identifying any heading compatible seed points within a predefined perpendicular distance threshold D from the current edge and, if any such heading compatible seed points are identified, removing the heading compatible seed points from the processing list. See block 78. In this regard, a heading compatible seed point is another seed point that is associated with a heading that is equal to or, in some embodiments, within a predefined range of the edge direction. The polyline is then considered to have converged in this direction. See block 80 of FIG. 4. The polyline creation process of FIG. 4 is then repeated so as to create a polyline that extends from the respective seed point, but in the opposite orientation.

However, in an instance in which a heading compatible vertex point is not identified to be in proximity to the current edge, the apparatus 12 of an example embodiment includes means, such as the processor 13 or the like, for adding the constrained weighted center of mass as a vertex to the polyline that is currently being constructed. See block 82 of FIG. 4. In an example embodiment, the apparatus also includes means, such as the processor or the like, for identifying any heading compatible seed points within a predefined distance or radius R from the current edge and, if any such heading compatible seed points are identified, removing the heading compatible seed points from the processing list. See block 84. The foregoing process of extending the polyline may then be repeated with the second point now serving as the first point from which the polyline is to be extended during the subsequent iteration of the polyline creation process. See block 86 as well as FIG. 5 in which the polyline is subsequently extended to a third point having a respective constrained weighted center of mass 58, an orientation 59 and a constraint limiting its movement along line 52.

Once a polyline has been created so as to extend from a respective seed point and, in some embodiments, in opposite directions from the respective seed point, the apparatus 12, such as the processor 13 or the like, is configured to determine if polylines have been created for all seed points and/or if all seed points have been included in a respective polyline. In an instance in which polylines have been created for all seed points and/or if all seed points have been included in a respective polyline, the polyline creation process may be terminated and the resulting network of polylines may be considered to represent the bi-directional road geometry. In this regard, polylines would have been created both for the seed points associated with a first orientation, such as may be associated with travel in a first direction along a road, but also for the seed points associated with a second orientation, such as may be associated with travel in a second direction along the road. As such, polylines representative of each distinct direction of travel, such as opposed directions of travel, along a road may be created, such as for use with ADAS, regardless of whether the road is divided. See, for example, FIG. 8 in which polylines 90 and 92 have been created along the respective centerlines for the two different directions of travel along the road. Although not shown in FIG. 8, since the polylines follow the road center in each direction of travel, the polylines may shift laterally in an instance in which the number of lanes and, therefore, the road center placement, changes.

However, if polylines have not been created for all seed points and/or if all seed points have not been included in a respective polyline, the polyline creation process, such as shown, for example, in FIG. 4, may be repeated for each respective seed point. In this regard, the polyline creation process may initially create polylines representative of one direction of travel along the bi-directional road geometry by extending first and second polylines in opposite orientations from a seed point. Thereafter, the polyline creation process may be repeated to create polylines representative of another direction of travel along the bi-directional road geometry, such as in the opposite direction. In this regard, polylines may be extended in opposite directions from another seed point representative of one or more other probe points that have an orientation associated with the other direction of travel along the bi-directional road geometry. After all polylines have been created, a road network graph may be created by performing polyline intersection detection. In this regard, at curve ends and at each polyline intersection, a node is created to indicate the end point for each road segment. As nodes are detected, the road network graph is updated.

As described above, the method, apparatus and computer program product of an example embodiment are configured to create polylines representative of bi-directional road geometry. By repeating the foregoing polyline creation process for each seed point that is not included in the polyline creation process of another seed point and by identifying those instances in which polylines converge, a consistent set of polylines representative of bi-directional road geometry may be created, even in instances in which the probe data is sparse and/or is collected by relatively slow moving probe sources which may result in probe data having unreliable headings or trajectories associated therewith. Thus, the method, apparatus and computer program product are configured to create polylines representative of a bi-directional road geometry, such as for mapping navigational purposes including, for example, ADAS, for a wide variety of roads including those in the neighborhood.

FIGS. 2 and 4 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 15 of an apparatus 12 employing an embodiment of the present invention and executed by a processor 13 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of a map and positioning engine for defining a bi-directional road geometry, the method comprising:
   determining, with a processor of the map and positioning engine, an orientation representative of one or more probe points; and
   determining, with the processor of the map and positioning engine, a seed point representative of one or more probe points, wherein determining the seed point comprises determining a constrained weighted center of mass of the one or more probe points, and wherein the determining the constrained weighted center of mass comprises limiting movement of the constrained weighted center of mass to a direction based upon respective headings of the one or more probe points; and
   creating polylines, with the processor of the map and positioning engine, representative of the bi-directional road geometry to facilitate navigation along roads represented by the polylines, wherein creating the polylines comprises creating polylines representative of one direction of travel along the bi-directional road geometry by:
   extending, with the processor of the map and positioning engine, a first polyline in the orientation from the seed point, wherein extending the first polyline comprises:
      extending the first polyline from the seed point to a second point that is spaced from the seed point and is disposed in the orientation from the seed point;
      following definition of the second point, determining a count of heading compatible probe points proximate the second point that have a compatible heading to the orientation of the seed point;
      determining whether the first polyline has converged based on the determined count of heading compatible probe points proximate the second point in relation to a minimum probe point count threshold, wherein the minimum probe count threshold is a positive number greater than 0, and wherein determining whether the first polyline has converged comprises determining that the first polyline has converged in an instance in which the count of heading compatible probe points is less than the minimum probe point count threshold even though there are one or more heading compatible probe points proximate the second point; and
      repeating extension of the first polyline beyond the second point dependent upon the count of heading compatible probe points proximate the second point equaling or exceeding the minimum probe point count threshold; and
   extending, with the processor of the map and positioning engine, a second polyline in an opposite orientation from the seed point.

2. A method according to claim 1 wherein creating polylines further comprises creating polylines representative of another direction of travel along the bi-directional road geometry by extending polylines in opposite directions from another seed point representative of one or more other probe points that have an orientation associated with the other direction of travel along the bi-directional road geometry.

3. A method according to claim 1 wherein limiting movement of the constrained weighted center of mass comprises limiting movement of the constrained weighted center of mass to a direction perpendicular to a median heading of the one or more probe points.

4. A method according to claim 1 wherein the second point is spaced from the first point by a predefined amount, and wherein extending the first polyline further comprises:
    determining an orientation representative of one or more probe points proximate the second point;
    determining a constrained weighted center of mass of one or more probe points proximate the second point, wherein determining the constrained weighted center of mass comprises limiting movement of the constrained weighted center of mass to a direction based upon respective headings of the one or more probe points proximate the second point; and
    repeating extension of the first polyline in the orientation from the constrained weighted center of mass of the one or more probe points proximate the second point.

5. A method according to claim 4 wherein extending the first polyline further comprises:
    determining if a vertex angle from the first point to the constrained weighted center of mass of one or more probe points proximate the second point satisfies a vertex angle threshold; and
    determining that the first polyline has converged in an instance in which the vertex angle fails to satisfy the vertex angle threshold.

6. A method according to claim 4 wherein extending the first polyline further comprises:
    determining if a heading compatible vertex point is located proximate an edge extending from a first point to the constrained weighted center of mass of one or more probe points proximate the second point;
    in an instance in which a heading compatible vertex point is located proximate the edge, adding the vertex point to the first polyline and determining that the first polyline has converged; and
    in an instance in which a heading compatible vertex point is not located proximate the edge, adding the constrained weighted center of mass of one or more probe points proximate the second point to the first polyline and continuing to extend the first polyline therefrom.

7. A method according to claim 1 further comprising defining a plurality of grid cells, each grid cell including at least one probe point, wherein determining the seed point comprises determining a seed point for each grid cell.

8. A method according to claim 7 further comprising determining a heading density for the one or more probe points proximate each respective seed point by determining a number of the one or more probe points that have compatible headings to the heading of the respective seed point, wherein creating the polylines comprises identifying the seed point from which the first and second polylines will be extended based upon the heading densities of the seed points.

9. A map and positioning engine for defining a bi-directional road geometry, the map and positioning engine comprising at least one processor and at least one memory including computer program code, the at least one memory and computer program code configured to, with the processor, cause the apparatus to at least:
    determine an orientation representative of one or more probe points;
    determine a seed point representative of one or more probe points, wherein the at least one memory and computer program code are configured to, with the processor, cause the apparatus to determine the seed point by determining a constrained weighted center of mass of the one or more probe points, and wherein the at least one memory and computer program code are configured to, with the processor, cause the apparatus to determine the constrained weighted center of mass by limiting movement of the constrained weighted center of mass to a direction based upon respective headings of the one or more probe points; and
    create polylines representative of the bi-directional road geometry to facilitate navigation along roads represented by the polylines, wherein the at least one memory and computer program code are configured to, with the processor, cause the apparatus to create the polylines representative of one direction of travel along the bi-directional road geometry by:
    extending a first polyline in the orientation from the seed point, wherein extending the first polyline comprises:
        extending the first polyline from the seed point to a second point that is spaced from the seed point and is disposed in the orientation from the seed point;
        following definition of the second point, determining a count of heading compatible probe points proximate the second point that have a compatible heading to the orientation of the seed point;
        determining whether the first polyline has converged based on the determined count of heading compatible probe points proximate the second point in relation to a minimum probe point count threshold, wherein the minimum probe count threshold is a positive number greater than 0, and wherein determining whether the first polyline has converged comprises determining that the first polyline has converged in an instance in which the count of heading compatible probe points is less than the minimum probe point count threshold even though there are one or more heading compatible probe points proximate the second point; and
        repeating extension of the first polyline beyond the second point dependent upon the count of heading compatible probe points proximate the second point equaling or exceeding the minimum probe point count threshold; and
    extending a second polyline in an opposite orientation from the seed point.

10. A map and positioning engine according to claim 9 wherein the at least one memory and computer program code are further configured to, with the processor, cause the apparatus to create polylines by creating polylines representative of another direction of travel along the bi-directional road geometry by extending polylines in opposite directions from another seed point representative of one or more other probe points that have an orientation associated with the other direction of travel along the bi-directional road geometry.

11. A map and positioning engine according to claim 9 wherein the at least one memory and computer program code are configured to, with the processor, cause the apparatus to limit movement of the constrained weighted center of mass by limiting movement of the constrained weighted center of mass to a direction perpendicular to a median heading of the one or more probe points.

12. A map and positioning engine according to claim 9 wherein the second point is spaced from the first point by a predefined amount, and wherein the at least one memory and computer program code are configured to, with the processor, cause the apparatus to extend the polyline by:
  determining an orientation representative of the one or more probe points proximate the second point; and
  determining a constrained weighted center of mass of one or more probe points proximate the second point, wherein the at least one memory and the computer program code are configured to, with the processor, cause the apparatus to determine the constrained weighted center of mass by limiting movement of the constrained weighted center of mass to a direction based upon respective headings of the one or more probe points proximate the second point; and
  repeating extension of the first polyline in the orientation from the constrained weighted center of mass of the one or more probe points proximate the second point.

13. A map and positioning engine according to claim 12 wherein the at least one memory and computer program code are further configured to, with the processor, cause the apparatus to extend the first polyline by:
  determining if a vertex angle from the first point to the constrained weighted center of mass of one or more probe points proximate the second point satisfies a vertex angle threshold; and
  determining that the first polyline has converged in an instance in which the vertex angle fails to satisfy the vertex angle threshold.

14. A map and positioning engine according to claim 12 wherein the at least one memory and computer program code are further configured to, with the processor, cause the apparatus to extend the first polyline by:
  determining if a heading compatible vertex point is located proximate an edge extending from a first point to the constrained weighted center of mass of one or more probe points proximate the second point;
  in an instance in which a heading compatible vertex point is located proximate the edge, adding the vertex point to the first polyline and determining that the first polyline has converged; and
  in an instance in which a heading compatible vertex point is not located proximate the edge, adding the constrained weighted center of mass of one or more probe points proximate the second point to the first polyline and continuing to extend the first polyline therefrom.

15. A map and positioning engine according to claim 9 wherein the at least one memory and computer program code are further configured to, with the processor, cause the apparatus to define a plurality of grid cells, each grid cell including at least one probe point, wherein the at least one memory and computer program code are configured to, with the processor, cause the apparatus to determine the seed point by determining a seed point for each grid cell.

16. A map and positioning engine according to claim 15 wherein the at least one memory and computer program code are further configured to, with the processor, cause the apparatus to determine a heading density for the one or more probe points proximate each respective seed point by determining a number of the one or more probe points that have compatible headings to the heading of the respective seed point, and wherein the at least one memory and computer program code are configured to, with the processor, cause the apparatus to create the polylines by identifying the seed point from which the first and second polylines will be extended based upon the heading densities of the seed points.

17. A computer program product of a map and positioning engine for defining a bi-directional road geometry, the computer program product comprising at least one non-transitory computer-readable storage medium having computer-executable program code portions stored therein, the computer-executable program code portions comprising program code instructions configured, upon execution by a processor of the map and positioning engine, to:
  determine an orientation representative of one or more probe points;
  determine a seed point representative of one or more probe points, wherein the program code instructions configured to determine the seed point comprise program code instructions configured to determine a constrained weighted center of mass of the one or more probe points, and wherein the program code instructions configured to determine the constrained weighted center of mass comprise program code instructions configured to limit movement of the constrained weighted center of mass to a direction based upon respective headings of the one or more probe points;
  create polylines representative of the bi-directional road geometry to facilitate navigation along roads represented by the polylines, wherein the program code instructions configured to create the polylines comprise program code instructions configured to create polylines representative of one direction of travel along the bi-directional road geometry by:
    extending a first polyline in the orientation from the seed point, wherein extending the first polyline comprises:
      extending the first polyline from the seed point to a second point that is spaced from the seed point and is disposed in the orientation from the seed point;
      following definition of the second point, determining a count of heading compatible probe points proximate the second point that have a compatible heading to the orientation of the seed point;
      determining whether the first polyline has converged based on the determined count of heading compatible probe points proximate the second point in relation to a minimum probe point count threshold, wherein the minimum probe count threshold is a positive number greater than 0, and wherein determining whether the first polyline has converged comprises determining that the first polyline has converged in an instance in which the count of heading compatible probe points is less than the minimum probe point count threshold even though there are one or more heading compatible probe points proximate the second point; and
      repeating extension of the first polyline beyond the second point dependent upon the count of heading compatible probe points proximate the second point equaling or exceeding the minimum probe point count threshold; and
    extending a second polyline in an opposite orientation from the seed point.

18. A computer program product according to claim 17 wherein the program code instructions configured to create polylines comprise program code instructions configured to create polylines representative of another direction of travel along the bi-directional road geometry by extending polylines in opposite directions from another seed point representative of one or more other probe points that have an orientation associated with the other direction of travel along the bi-directional road geometry.

19. A computer program product according to claim 17 wherein the program code instructions configured to limit movement of the constrained weighted center of mass comprise program code instructions configured to limit movement of the constrained weighted center of mass to a direction perpendicular to a median heading of the one or more probe points.

20. A computer program product according to claim 17 wherein the second point is spaced from the first point by a predefined amount, and wherein the program code instructions configured to extend the polyline comprise program code instructions configured to:
- determine an orientation representative of the one or more probe points proximate the second point;
- determine a constrained weighted center of mass of one or more probe points proximate the second point, wherein the program code instructions are configured to determine the constrained weighted center of mass by limiting movement of the constrained weighted center of mass to a direction based upon respective headings of the one or more probe points proximate the second point; and
- repeat extension of the first polyline in the orientation from the constrained weighted center of mass of the one or more probe points proximate the second point.

* * * * *